March 20, 1956

F. L. CORBIN 2,739,200

BRAKE CONTROL SYSTEMS

Original Filed Nov. 1, 1949

INVENTOR.
FRANK L. CORBIN
BY

United States Patent Office 2,739,200
Patented Mar. 20, 1956

2,739,200

BRAKE CONTROL SYSTEMS

Francis L. Corbin, Chatham, N. J.

Substituted for application Serial No. 124,920, November 1, 1949. This application September 20, 1954, Serial No. 456,930

7 Claims. (Cl. 200—80)

This application is substituted for my prior application, Serial No. 124,920, filed November 1, 1949 (now abandoned).

This invention relates to improvements in brake control systems, and more particularly to the construction of a controller switch for controlling the action of a valve in the brake system.

This invention is also an improvement of the brake control system set forth in the prior application of Frank H. Boesche et al., Serial No. 492, filed January 5, 1948, now Patent No. 2,571,821, granted October 16, 1951.

In said prior application, a controller switch was provided for controlling the action of a solenoid-actuated valve connected in a hydraulic brake system for controlling the action of the brakes of a motor vehicle. This switch was operated automatically by the movement of the vehicle, for which purpose it was shown as connected with the speedometer cable.

The object of this invention is to improve the construction of the controller switch, to eliminate several objections encountered with the switch shown in the prior application, to provide for more positive action and better electrical connection of the switch in response to movement of the motor vehicle.

In carrying out this object, the controller switch according to this invention has several improved features, including a single bearing for the rotor assembly, more perfect balance and spring action of the rotor disc or ring, and better electrical connections between the ring and the shaft, as well as with the slip ring provided in the switch. These and other features hereinafter described materially improve the construction, assembly and manner of operation of the controller switch over that set forth in the prior application referred to above.

This embodiment of the invention is illustrated generally in the accompanying drawings, in which.

Figure 1:
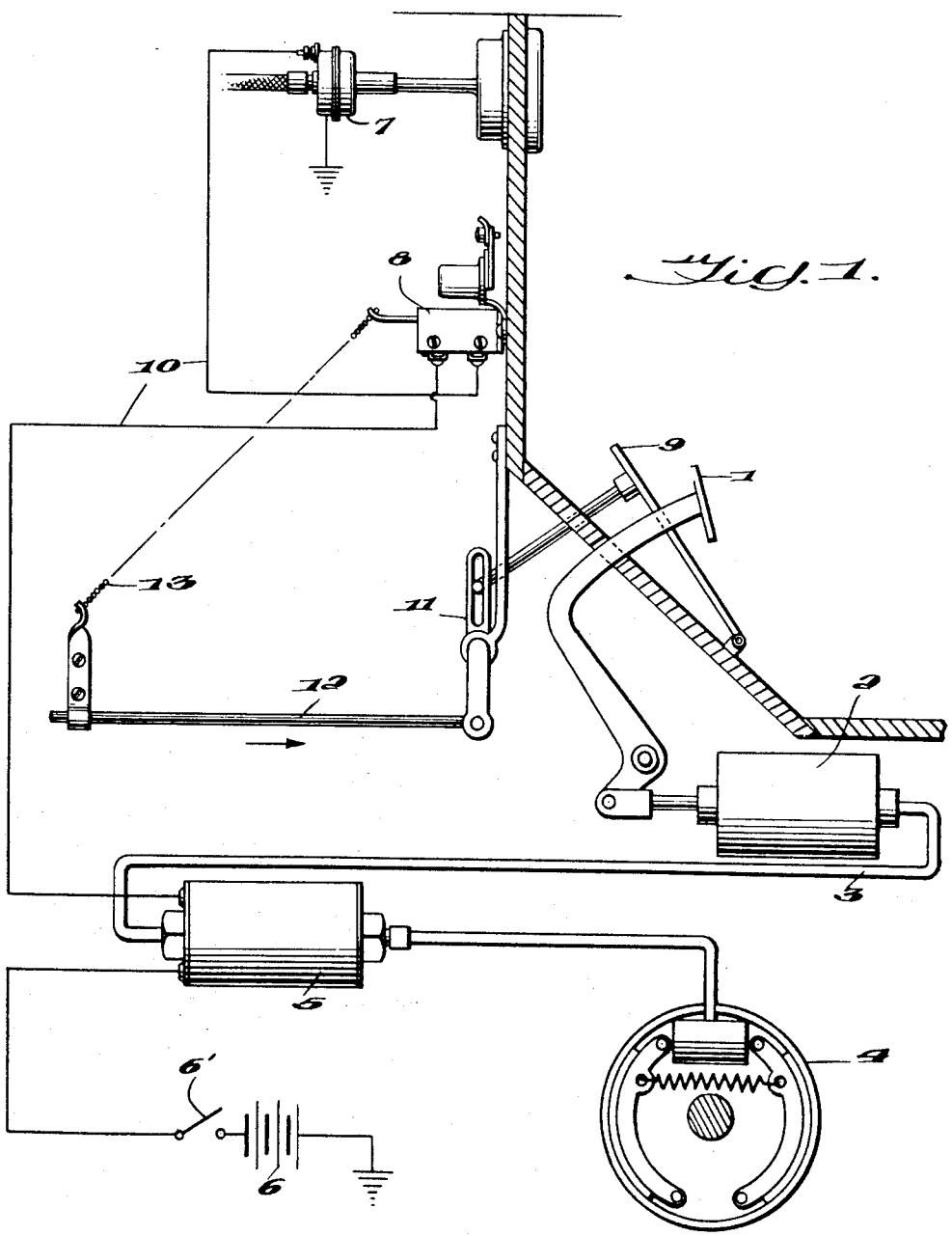
Fig. 1 is a diagrammatic side elevation, partly in section, showing an application of the controller switch in a brake control system.

In the brake control system illustrated in Fig. 1, the usual foot brake pedal is designated generally by the numeral 1 for applying pressure in a master cylinder 2 of a hydraulic brake system, which pressure is communicated through a line 3 to a hydraulic wheel brake 4, the structure of which is well known, and need not be described in detail. When the brake pedal 1 is depressed, the hydraulic fluid pressure travels from the master cylinder 2 through the line 3 to the hydraulic power device that controls the brake shoes of the wheel brake 4 to expand the shoes and cause braking action on the wheel.

Connected in the line 3 is a solenoid-actuated valve 5 adapted to be energized by a source of direct electric current, such as a battery 6, which may be the usual battery of an automobile when the invention is used in the application illustrated. As shown in Fig. 1, the energizing of the solenoid valve 5 is controlled automatically by switch devices illustrated generally at 7 and 8.

The switch device 7 normally is closed when the vehicle is at rest, but is actuated by the speedometer cable 7' in the example illustrated to break the circuit to the valve 5 immediately upon the starting in motion of the vehicle, or when the vehicle reaches a predetermined speed, as for instance, in excess of two miles per hour as one example. The speedometer cable 7' normally extends to the usual speedometer 8'.

The switch 8 normally is closed when the engine is idling but is adapted to be actuated by an accelerator pedal 9 of the motor vehicle, whereby the despressing of the pedal 9 will break the circuit indicated at 10 that connects the switches 7 and 8 and the battery 6 with the solenoid-actuated valve 5. The accelerator pedal 9 is shown as operatively connected with a lever 11 from which a rod 12 forms the usual connection therefrom to the carburetor. In the example illustrated, the rod 12 has a flexible connection 13 with the switch 8 normally tending to release the switch to close the circuit when the accelerator pedal 9 is released.

Figure 2:
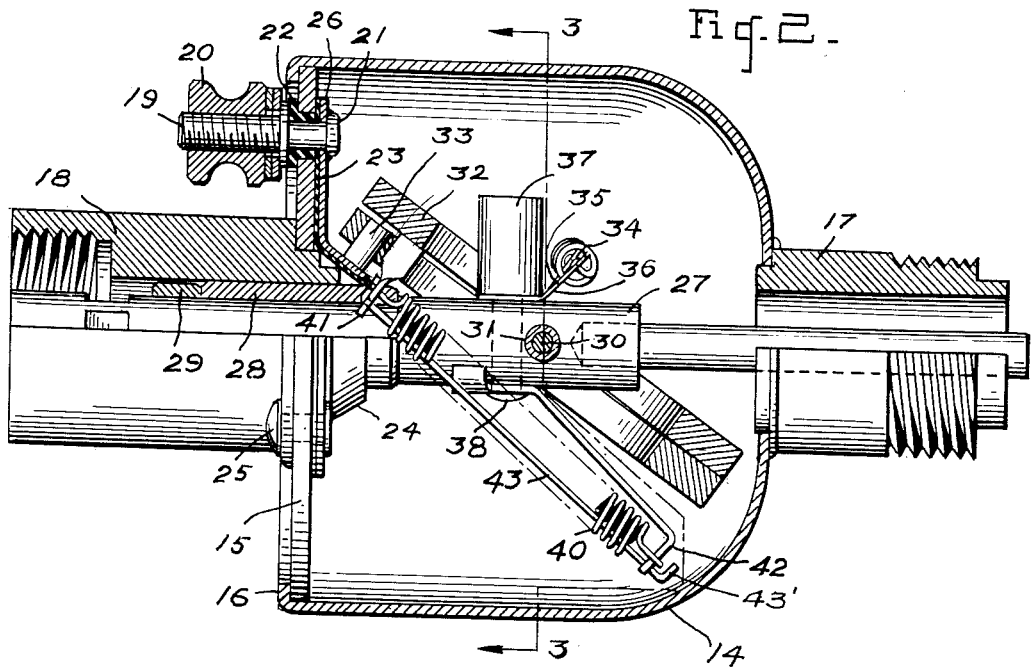
Fig. 2 is a longitudinal section through the controller switch, parts being in elevation.
Figure 3:
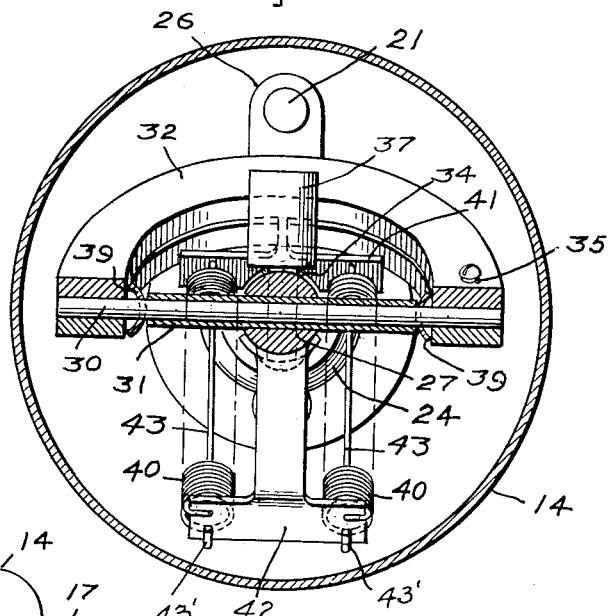
Fig. 3 is a cross section therethrough on the line 3—3 in Fig. 2.
Figure 4:
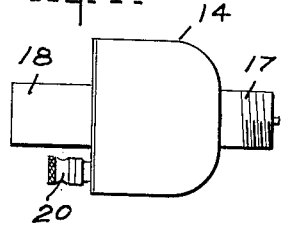
Fig. 4 is a side elevation of the controller switch.

The structure of the controller switch or circuit breaker 7 is shown more in detail in Figs. 2 and 3.

The controller switch 7 includes a housing 14 substantially of cup shape with one end partially closed and the opposite end open. A plate 15 is fitted within the last mentioned end and secured in place in the housing 14 by a crimped portion at the end of the housing, as indicated generally at 16. The first-mentioned end of the housing 14 is provided with a tubular coupling 17, while the end of plate 15 has a bearing end assembly 18 fitted therein and projecting therefrom, as shown in Fig. 2.

Mounted on the end plate 15 is a terminal adapted for electrical connection with one side of the electrical circuit 10, while the housing 14 is grounded to the frame of the vehicle, as indicated in Fig. 1. This terminal includes a bolt 19 provided with a knurled nut 20 of the character usually provided for electrical terminals. The bolt 19 is secured in place by a rivet head 21 at the inner end thereof and passes through an insulating grommet 22 and through an insulating plate 23 that serve to insulate the bolt 19 effectively from the end plate 15.

A slip ring 24 is mounted on the inner face of the end plate 15 and is secured in place by one or more rivets 25. This slip ring 24 is conical, as shown in Fig. 2, and covers the inner end of the bearing end assembly 18. An arm 26 on the slip ring 24 extends upwardly to the bolt 19 to which it is secured by the rivet portion 21 thereof.

A rotor assembly is mounted in the housing 14 adapted to be connected with the speedometer shaft or other speed responsive portion of the vehicle. This rotor assembly comprises a shaft 27 mounted in a single bearing 28 within the bearing end assembly 18. A single bearing at one end only of the shaft provides a sufficient journal for the shaft and yet facilitates the assembly of the unit without any problem of bearing alignment. This also makes it much easier to control the amount of end-play in the shaft 27. The shaft is held in the bearing sleeve 28 by a shoulder on the shaft at one end of the sleeve, and by a thrust ring 29 press-fitted on the shaft at the opposite end of the sleeve 28. The shaft 27 is adapted to be connected at its opposite ends with aligned portions of the speedometer cable 7' and the driving shaft of the speedometer 8' in the embodiment illustrated.

Extending transversely through the shaft 27 is a cross shaft 30. The shaft 30 extends through a bushing 31 in which it is journaled, the bushing 31 also extending through the rotor shaft 27 for freedom of turning movement of the cross shaft with respect to the rotor shaft. The cross shaft 30 carries at its opposite ends a rotor disc, generally indicated at 32, and shown as in the form of two rings fixed at opposite ends to the cross shaft in embracing relation thereon, and secured rigidly together in face-to-face relation. The cross shaft 30 extends diametrically across the center of the rotor disc 32. One of the rings of the rotor disc 32 carries a contact 33 on the lower face thereof in position for electrical contact with the slip ring 24 when the parts are in the positions shown in Fig. 2.

The rotor disc 32 is adapted to be connected with the rotor shaft 27 so as to complete the circuit through the controller switch by the grounding of the housing 14, whenever the contact 33 is in electrical engagement with the slip ring 24. A flexible electrical conductor 34 is connected at one end at 35 with one side of the rotor disc 32, and is connected at the opposite end at 36 directly with the rotor shaft 27. This electrical connection with the shaft is shown as being through a counter-weight pin 37 extending diametrically through the shaft 27 and held in place by a rivet portion 38, the end connection 36 being confined and secured beneath a shoulder on the pin 37 in electrical connection with the shaft. The flexible conductor 34 is in the form of a spring coil. This form of electrical connection between the rotor disc and shaft provides better connection than could be obtained through the cross shaft and eliminates possible arcing and pitting that might be experienced between the cross shaft and its bushing, with resultant increasing of the electrical resistance of the controller as well as a bad bearing and excessive friction thereby obtained.

The rotor ring 32 is centered lengthwise on the cross shaft 30 by cupped spring washers 39 placed between the rotor disc and the cross shaft bearing 31, as shown in Fig. 3. These washers 39 eliminate all end-play and yet provide an assembly which may be fitted together easily with normal tolerances on all of the parts. They serve also to prevent noise in the controller which might result otherwise from sliding movement of the rotor disc endwise of the cross shaft, especially at low rotational speeds.

The rotor disc 32 normally is maintained in its contact position, as shown in Fig. 2, by coiled springs 40 shown as mounted on opposite sides of a vertical plane through the center axis of the rotor shaft 27. These coiled springs 40 are secured at opposite ends to spring anchors 41 and 42. The anchor 41 is secured to the rotor disc 32 adjacent the contact 33 in position to apply a pulling action to that portion of the rotor disc, normally tending to cause the contact 33 to bear upon the slip ring 24. The spring anchor 42 is secured to the under side of the rotor shaft 27 by the rivet portion 38 of the counter-weight pin 37. This spring anchor 42 serves also to limit the swinging movement of the rotor ring 32 in one direction. The springs may be provided with guide members 43 extending therethrough to maintain them in proper alignment. These guide members 43 are slidable through the spring anchors 41 and 42 and have upturned opposite ends 43' to hold them in position.

The actuating springs 40 are so arranged as to provide a decided toggle action on the rotor disc 32. The torque created by the centrifugal force due to the rotation of the controller and the springs is so balanced that once the contact 33 starts to leave the slip ring 24 on an increase in the speed of movement of the vehicle, the force urging the contact away from the slip ring increases with displacement around the axis of the cross shaft 30 until the rotor disc reaches the stop formed by the spring anchor 42. Conversely, on a decrease of the speed of movement of the vehicle and of the speedometer shaft, the movement of the upper portion of the rotor disc 32 away from the stop 42 causes the force due to the springs 40 that urge the contacts 33 toward the slip ring 24 to increase with the movement of the contact toward the slip ring and away from the stop 42. This produces more certain electrical contact and also reduces chatter of the brush against the slip ring due to non-uniform rotation at operative speed.

The counter-weight provided by the pin 37 produces a substantially perfect balance of the rotor assembly, since the counter-weight extends in the opposite direction from the spring anchor 42. This results in a much quieter operating of the controller than would be provided otherwise.

The construction of the rotor assembly is so balanced that the brush contact 33 normally is in engagement with the slip ring 24 whenever the vehicle is at rest. Movement of the vehicle even at slow speed of, for instance, two miles per hour, results in movement of the brush contact 33 away from the slip ring. The only force acting on the rotor assembly to move the brush contact 33 away from the slip ring is the centrifugal force resulting from the rotation of the rotor assembly about its own axis. Other accelerating forces or gravity do not affect the rotor assembly because of its mounting on its center of gravity.

The construction otherwise will operate substantially as described in the application mentioned above.

It will be evident from the above that the circuit 10 will be closed as described to energize the solenoid-operated valve 5 and close the valve as soon as the vehicle has been brought to rest, thus holding the brake 4 applied until this circuit is broken either at the switch 8 or at the switch 7. The latter is controlled by the movement of the vehicle and the switch 8 will not be opened until the accelerator pedal 9 has been actuated for operation of the engine. Upon depressing movement of the accelerator pedal, the rod 12 will move in the direction indicated by the arrow in Fig. 1 for opening the switch 8, thereby breaking the circuit 10 and releasing the solenoid-actuated switch 5. As soon as the vehicle has been moved to the required extent, the switch 7 will be opened by the action of the speedometer cable thereby maintaining the circuit 10 open until the vehicle again is brought to rest.

The character of the solenoid-actuated valve 5 is described more in detail in an accompanying application, while the switch 8 may be of any suitable or desired character which will function as described.

While the invention has been illustrated and described in one embodiment, it is recognized that variations and changes may be made therein without departing from the invention, except as specified in the claims.

I claim:

1. A controller switch for a brake control system comprising a housing, a supporting plate fixed to the housing, a terminal mounted on the supporting plate and insulated therefrom, a conical slip ring mounted on the supporting plate in the housing and electrically connected with the terminal, a shaft mounted in the housing, a rotor ring journaled on the shaft for swinging movement relative thereto, and a contact brush carried by the ring in position to engage the conical portion of the slip ring at right angles to the rotor ring upon swinging movement of the rotor ring in one direction, said slip ring extending in the path of movement of the rotor ring toward the axis of the shaft in position to be engaged by the contact brush upon said inward swinging movement of the rotor ring.

2. A controller switch for a brake control system comprising a housing, a supporting plate fixed to the housing, a terminal mounted on the supporting plate and insulated therefrom, a conical slip ring mounted on the supporting plate in the housing and electrically connected with the terminal, a shaft mounted in the housing, a rotor ring journaled on the shaft for swinging movement relative thereto, a contact brush carried by the ring and extending at right angles thereto in position to engage the conical portion of the slip ring at right angles thereto upon swinging movement of the rotor ring in one direction, a coiled spring connected at one end with the rotor ring and extending therefrom to the opposite side of the axis of movement of the rotor ring, and anchor means connected with the last mentioned end of the coiled spring for anchoring said spring in position.

3. A controller switch for a brake control system comprising a housing, a supporting plate fixed to the housing, a terminal mounted on the supporting plate and insulated therefrom, a conical slip ring mounted on the supporting plate in the housing and electrically connected with the terminal, a shaft mounted in the housing, a rotor ring journaled on the shaft for swinging movement relative thereto, a contact brush carried by the ring in position to engage the slip ring upon swinging movement of the rotor ring in one direction, a coiled spring connected at one end with the rotor ring and extending therefrom to the opposite side of the axis of movement of the rotor ring, anchor means connected with the last mentioned end of the coiled spring for anchoring said spring in position, and a counterweight connected with the shaft in position to counter-balance the spring and end connection whereby the rotor ring is substantially unaffected by gravity as the shaft is rotated.

4. A controller switch for a brake control system comprising a rotor assembly including a shaft, a rotor ring surrounding the shaft, a cross shaft connecting the rotor ring with the first mentioned shaft and forming a journal thereon for the rotor ring, electrical contact means connected with the rotor ring, a coiled spring extending to opposite sides of the axis of the cross shaft transversely thereof, anchor members connected with opposite ends of the coiled spring, one of said anchor members being connected with the rotor ring and the other anchor member being connected with the first mentioned shaft, and a counterweight connected with the shaft on the opposite side thereof from the anchor member substantially to counter-balance the spring and anchor member connected therewith, whereby the rotor ring will be substantially unaffected by gravity as said shaft rotates.

5. A controller switch for a brake control system comprising a rotor assembly including a shaft, a rotor ring surrounding the shaft, a cross shaft connecting the rotor ring with the first mentioned shaft and forming a journal thereon for the rotor ring, electrical contact means connected with the rotor ring, a coiled spring extending to opposite sides of the axis of the cross shaft transversely thereof, anchor members connected with opposite ends of the coiled spring, one of said anchor members being connected with the rotor ring and the other anchor member being connected with the first mentioned shaft, and a stop member attached to the first-mentioned shaft for limiting the swinging of the rotor ring on the cross shaft in a direction moving the contact means away from the first mentioned shaft.

6. A controller switch for a brake control system comprising a shaft, a rotor ring surrounding the shaft, a cross shaft journaling the rotor ring on the first-mentioned shaft, an electrical contact connected with the rotor ring substantially at right angles thereto, a slip ring having a conical portion in the path of said contact and substantially at right angles thereto, a stop member anchored at one end to the first-mentioned shaft and extending therefrom substantially parallel with the rotor ring to the opposite side thereof from the contact, and a pair of springs anchored at one end to the rotor ring adjacent the contact.

7. A controller switch for a brake control system comprising a shaft, a rotor ring surrounding the shaft, a cross shaft journaling the rotor ring on the first-mentioned shaft, a bushing sleeved over the cross shaft and extending through the first-mentioned shaft mounting the cross shaft thereon, an electrical contact connected with the rotor ring substantially at right angles thereto, a slip ring having a conical portion in the path of said contact and substantially at right angles thereto, a stop member anchored at one end to the first-mentioned shaft and extending therefrom substantially parallel with the rotor ring to the opposite side thereof from the contact, and a pair of springs anchored at one end to the rotor ring adjacent the contact.

References Cited in the file of this patent

UNITED STATES PATENTS

| | | |
|---|---|---|
| 744,198 | Howe et al. | Nov. 17, 1903 |
| 1,093,852 | Hendrickson | Apr. 21, 1914 |
| 1,098,358 | Dean | May 26, 1914 |
| 1,663,207 | Mallory | Mar. 20, 1928 |
| 2,571,821 | Boesche et al. | Oct. 16, 1951 |

FOREIGN PATENTS

| | | |
|---|---|---|
| 535,788 | France | Jan. 31, 1922 |